(12) United States Patent
Nagasawa et al.

(10) Patent No.: US 7,347,655 B2
(45) Date of Patent: Mar. 25, 2008

(54) HOLE PLUG

(75) Inventors: Norimasa Nagasawa, Hiroshima (JP); Noboru Obayashi, Hiroshima (JP)

(73) Assignee: Nifco Inc., Yokohama (JP)

( * ) Notice: Subject to any disclaimer, the term of this patent is extended or adjusted under 35 U.S.C. 154(b) by 670 days.

(21) Appl. No.: 10/662,344

(22) Filed: Sep. 16, 2003

(65) Prior Publication Data
US 2004/0091335 A1 May 13, 2004

(30) Foreign Application Priority Data
Nov. 13, 2002 (JP) .............................. 2002-329388

(51) Int. Cl.
F16B 19/00 (2006.01)

(52) U.S. Cl. ........................ 411/508; 24/297

(58) Field of Classification Search ................ 411/508, 411/913, 377, 509; 24/453, 297; 16/2.3
See application file for complete search history.

(56) References Cited

U.S. PATENT DOCUMENTS

| | | | | |
|---|---|---|---|---|
| 975,926 | A | * | 11/1910 | Bazeley ........................ 220/800 |
| 3,181,411 | A | * | 5/1965 | Mejlso ......................... 411/508 |
| 3,803,670 | A | * | 4/1974 | Johnson ........................ 411/508 |
| 3,991,446 | A | * | 11/1976 | Mooney et al. .............. 411/548 |
| 4,012,078 | A | * | 3/1977 | Meyers ...................... 301/37.35 |
| 4,091,962 | A | | 5/1978 | Van Buren, Jr. |
| 4,363,420 | A | * | 12/1982 | Andrews ...................... 220/787 |
| 4,504,009 | A | * | 3/1985 | Boik et al. .................... 229/5.5 |
| 4,761,319 | A | | 8/1988 | Kraus et al. |
| 5,551,191 | A | * | 9/1996 | Maiwandi ..................... 49/465 |
| 6,319,436 | B1 | * | 11/2001 | Jaeger et al. ............... 264/40.6 |
| 6,588,071 | B2 | * | 7/2003 | Gramss ......................... 24/297 |
| 6,708,979 | B2 | * | 3/2004 | Stratman et al. ............. 277/316 |
| D490,767 | S | * | 6/2004 | Nagasawa et al. ......... D12/400 |

FOREIGN PATENT DOCUMENTS

| | | |
|---|---|---|
| GB | 2 167 515 | 5/1986 |
| GB | 2 222 857 | 3/1990 |
| JP | 54-41761 | 12/1979 |
| JP | 63-7692 | 3/1988 |
| JP | 4-28594 | 5/1992 |
| JP | 2002-81428 | 3/2002 |

* cited by examiner

Primary Examiner—Flemming Saether
(74) Attorney, Agent, or Firm—Manabu Kanesaka

(57) ABSTRACT

A hole plug includes a head portion and a foot portion projecting from a back surface of the head portion to be inserted into a hole to be blocked. The foot portion has a cylindrical shape formed of several uprising plates extending from the back surface of the head portion. An engaging step portion is formed at a base end of each uprising plate for holding a rim of the hole to be blocked together with the head portion. A supporting device is formed at an inside of each uprising plate for limiting bending of each uprising plate inwardly in the radial direction.

12 Claims, 3 Drawing Sheets

HOLE PLUG

BACKGROUND OF THE INVENTION AND RELATED ART STATEMENT

The present invention relates to a hole plug for sealing a hole formed on a plate member such as a steel plate used for various types of products such as an automobile.

A hole plug basically includes a head portion and a foot portion projecting from a back surface of the head portion to be inserted into a hole to be blocked. As disclosed in Patent Reference No. 1, recently, this type of hole plug has a head portion having a roughly flat top surface without an opening for an aesthetic reason, and a foot portion having a foot portion main member projecting from a back surface of the head portion and several engaging claws turning toward the head portion side from an end of the foot portion main member for easy insertion into the hole. Each engaging claw can deforms (swing) around an end of the foot portion main member as a pivot in a radial direction of the foot portion main member. According to such a hole plug, when the hole plug is inserted into a hole formed in a plate member from the foot portion side, the hole plug is easily inserted as each engaging claw deforms inwardly in the radial direction, and a rim of the hole engages an engaging step portion at the end of the engaging claw. Therefore, the rim of the hole is held between the engaging step portion at the end of the engaging claw and the rim of the head portion, so that the hole plug is attached to the plate member and blocks the hole.

Patent Reference No.1

Japanese Patent Publication (Kokai) No. 2002-81428

However, in the case where the rim of the hole is held between the rim of the head portion and the engaging step portion at the end of each engaging claw with the above-mentioned hole plug, not only the rim of the head portion is bent, but also the engaging claw is easily bent (deforming in a direction that the engaging step portion moves away from the back surface of the head portion). Thus, the bending amount (snapping force) of the head portion relative to the rim of the hole is low. Thus, it is difficult to obtain sufficient sealing ability relative to the rim of the hole based on the bending of the rim of the head portion.

Also, in the hole plug, the foot portion projecting from the back surface of the head portion may be formed of several plate-like split foot portions (uprising plate portions) for easy insertion, and each split foot portion can be easily bent when the hole plug is inserted. However, in this case, while the split foot portions are easily bent, some of the split foot portions may be bent backward and caught by the rim of the hole when the split foot portions are inserted. As a result, the other split foot portions are inserted in the hole while some of the split foot portions are not inserted. Therefore, the hole plug is not inserted properly.

The present invention has been made in order to solve the above-mentioned problems, and the first object is to provide a hole plug in which the ability to seal the rim of the hole to be blocked is improved while keeping the insertion ability to be made easily. The second object is to provide a hole plug in which the inserting operation can be performed properly while keeping the insertion ability to be made easily.

Further objects and advantages of the invention will be apparent from the following description of the invention.

SUMMARY OF INVENTION

In order to achieve the first object, according to the present invention, a hole plug includes a head portion, and a foot portion projecting from a back surface of the head portion to be inserted into a hole to be blocked. The foot portion has a cylindrical shape formed of several uprising plates extending from the back surface of the head portion. An engaging step portion is formed at a base end of each uprising plate for holding a rim of the hole to be blocked together with the head portion. A supporting device is formed at an inside of each uprising plate for limiting inward bending of each uprising plate in a radial direction.

In order to achieve the second object, according to the present invention, a hole plug includes a head portion, and a foot portion projecting from a back surface of the head portion to be inserted into the hole to be blocked. The foot portion has a cylindrical shape formed of several uprising plates extending from the back surface of the head portion. An engaging step portion is formed at a base end of each uprising plate for holding a rim of the hole to be blocked together with the head portion. A guide portion is projected at the back surface of the head portion between the adjacent uprising plates, respectively. The guide portion is elongated to be longer than an uprising end of each uprising plate.

According to the first aspect of the invention, when the hole plug of the invention is inserted into the hole formed in the plate member from the foot portion side, each of the uprising plates bends around the base end (reduce a radius), and the foot portion is easily inserted into the hole. The engaging step portion is formed on the uprising plate extending from the back surface of the head portion, and does not bend or deform by an external force of the uprising plates in the uprising direction. Therefore, when the engaging step portions and the rim of the head portion sandwich the rim of the hole upon the insertion, only the rim of the head portion bends along the rim of the hole while the engaging step portions and the rim of the head portion sandwich the rim of the hole. Due to the bending, the sealing ability of the rim of the head portion relative to the rim of the hole is improved. Further, in this case, since the supporting device is provided at the inside of each of the uprising plate portions for limiting the inward bending of the uprising plate in the radial direction, the engagement between the engaging step portions of the uprising plate portions and the rim of the hole is reinforced. Therefore, with the hole plug of the present invention, it is possible to improve the sealing ability relative to the rim of the hole to be blocked while the easy insertion is maintained. Also, it is possible to stably maintain the engagement between the engaging step portions and the rim of the hole.

According to the second aspect of the invention, each of the supporting devices is provided at the base end side of the uprising plate rather closer than the uprising end side of the uprising plate. Thus, the base end side of the foot portion is limited so not as to reduce the radius, and the stable engagement between the engaging step portions and the rim of the hole can be maintained. On the other hand, when the foot portion is inserted into the hole, it is easy to insert because the uprising end side of the uprising plate bends easier than the base end side of the uprising plate.

According to the third aspect of the invention, the supporting devices are integrated with the back surface of the head portion. Thus, the inward bending force in the radial direction upon the insertion can be specifically received at the head portion through the supporting devices, and the stable engagement between the engaging step portions and the rim of the hole can be maintained.

According to the fourth aspect of the invention, the column integrally projects from the back surface of the head portion at an inside of a section defined by the uprising plates, and each of the supporting devices connects the column to each of the uprising plates. Thus, the inward bending force in the radial direction upon the insertion can be specifically received at the column through the supporting devices, and the stable engagement between the engaging step portions and the rim of the hole can be maintained.

According to the fifth aspect of the invention, each of the supporting devices is formed in a wavy plate, and the wavy plate is disposed such that the plate surface projects from the back surface of the head portion. Thus, it is possible to limit each of the uprising plates so as not to bend inwardly in the radial direction upon the insertion, while utilizing elasticity of the wavy plate to a certain extent. Accordingly, the insertion can be easily accomplished, and the stable engagement between the engaging step portions and the rim of the hole can be fully satisfied.

According to the sixth aspect of the invention, when the hole plug of the present invention is inserted into the hole, first, each of the guide portions is inserted into the hole. Following the guide portions, the foot portions, i.e. the uprising plates are smoothly guided into the hole. Thus, the insertion can be easily and properly done.

According to the seventh aspect of the invention, the cylindrical column integrally projects from the back surface of the head portion at an inside of a section defined by the uprising plates. The inner side surface of each of the guide portions is integrated with the outer circumferential surface of the column, and the supporting devices are disposed between the column and the uprising plates for limiting the inward bending in the radial direction of the uprising plates. Therefore, the cylindrical column is reinforced with each of the guide portions, and the inward bending force in the radial direction upon the insertion can be specifically received at the column through the supporting devices. Thus, while reducing the weight and raw materials, the stable engagement between the engaging step portions and the rim of the hole can be maintained.

According to the eighth aspect of the invention, each of the supporting devices is formed in the wavy plate, and the wavy plate is disposed such that the plate face projects from the back surface of the head portion. Thus, it is possible to limit each of the uprising plates so as not to bend inwardly in the radial direction upon the insertion, while utilizing elasticity of the wavy plate to a certain extent. Accordingly, the insertion can be easily accomplished, and the stable engagement between the engaging step portions and the rim of the hole can be fully satisfied.

According to the ninth aspect of the invention, the head portion is formed in the thin plate, and the rim of the head portion is sloped toward the back surface of the head portion outwardly in the radial direction of the head portion. Thus, when the engaging step portions and the head portion sandwich the rim of the hole, the bending force can be precisely applied on the rim of the head portion, and the whole head portion can be flat. Thus, while improving an appearance, the ability to seal the rim of the hole to be blocked can be also improved.

DETAILED DESCRIPTION OF PREFERRED EMBODIMENTS

Figure 1:
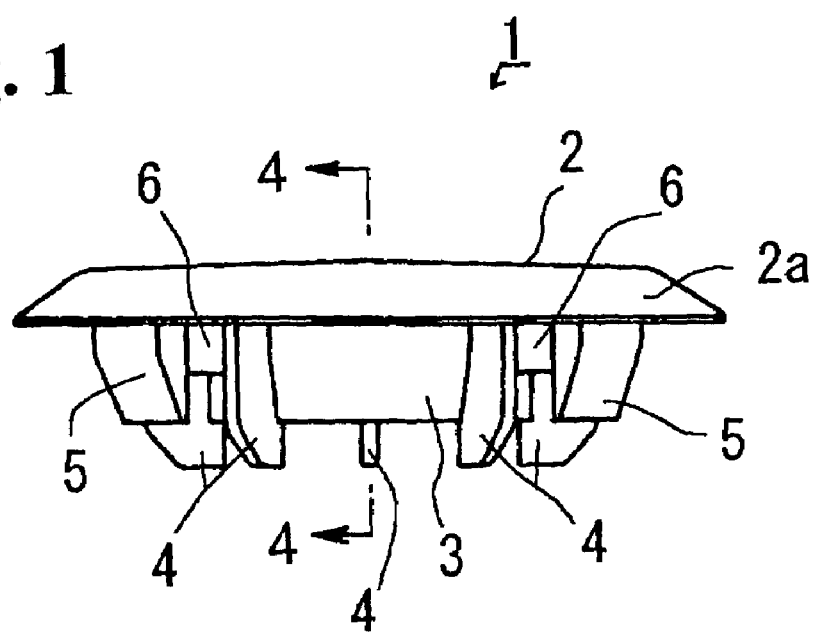
FIG. 1 is a front view of a hole plug according to an embodiment.
Figure 2:
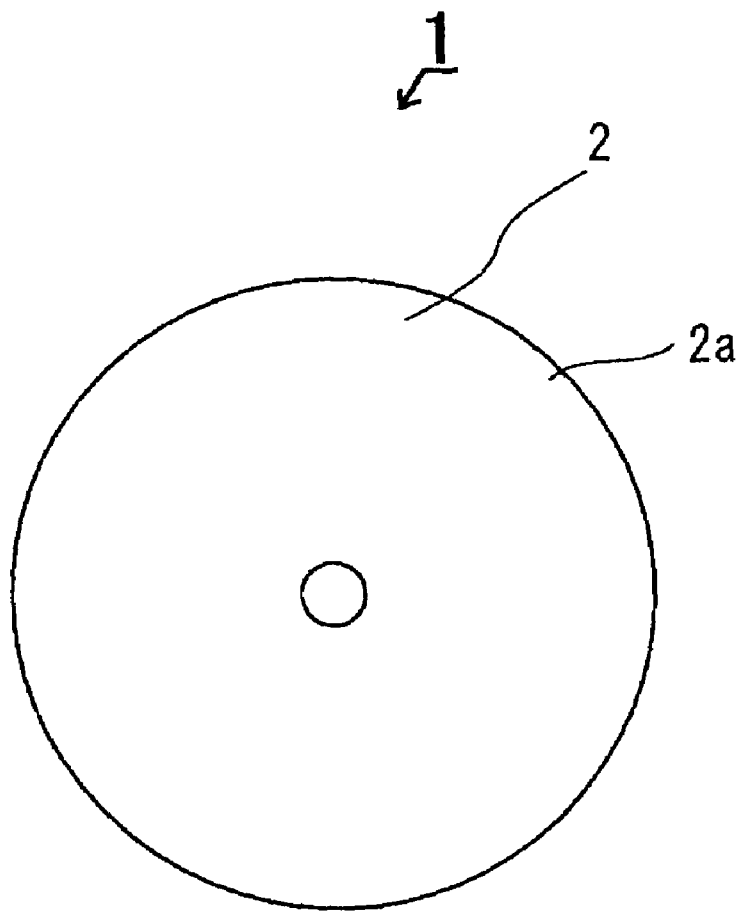
FIG. 2 is a plan view of the hole plug according to the embodiment.
Figure 3:
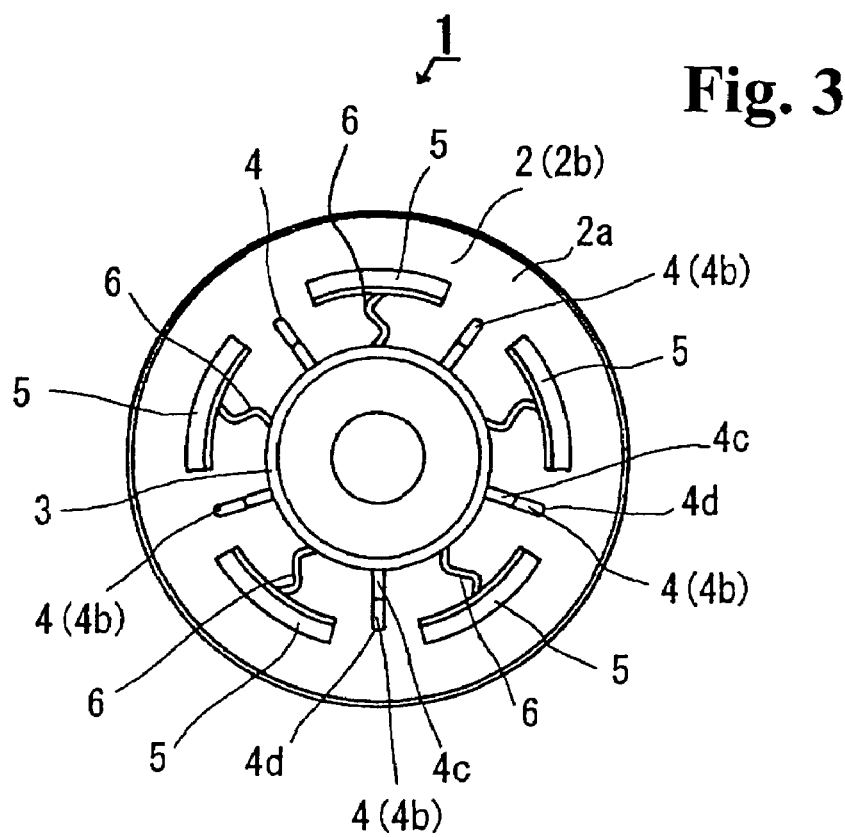
FIG. 3 is a bottom plan view of the hole plug according to the embodiment.
Figure 4:
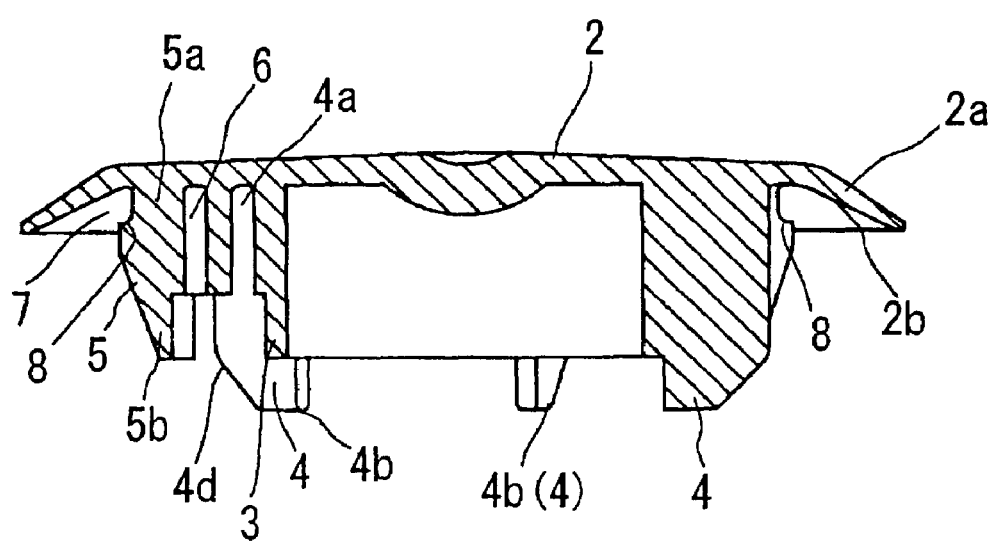
FIG. 4 is an enlarged sectional view taken along line 4-4 in FIG. 1.

Hereinafter, preferred embodiments of the present invention will be explained with reference to the accompanying drawings. In FIGS. 1-4, reference numeral 1 designates a hole plug according to the embodiment. The hole plug 1 includes a head portion 2, a column 3, several (five in this embodiment) guide portions 4, several (five in this embodiment) uprising plates 5 constituting the foot portion, and several (five in this embodiment) supporting portions 6 as a supporting device. Each component 2-6 is integrally formed of a synthetic resin such as polyethylene and the like.

The head portion 2 is a thin plate and formed in a circular disc shape. Most of the head portion 2 is formed in a flat shape except a rim 2a. The rim 2a is formed in a slope inclined toward a back surface 2b of the head portion 2 outwardly in the radial direction of the head portion 2 for providing elasticity upon bending.

The column 3 projects from the back surface 2b of the head portion 2. The column 3 is formed in a hollow cylinder shape in order to reduce a weight and a raw material, and a shaft center thereof is coaxial with a shaft center of the head portion 2. The column 3 has a diameter smaller than that of the head portion 2 (in the present embodiment, slightly smaller than a half of the radius of the head portion 2) to be an appropriate size for inserting into a hole 11 to be blocked (described later) with an enough gap (refer to FIG. 6).

The guide portions 4 respectively project from the back surface 2b of the head portion with an equal interval at an outer circumference of the column 3. Each of the guide portions 4 is formed in a rectangle plate, and extends vertically in a direction away from the back surface 2b of the head portion. One end face 4a thereof in the extending direction is integrated with the back surface 2b of the head portion, and one end face 4c thereof in the width direction is integrated with a side face of the column 3. With this configuration, each of the guide portions 4 has a plate surface extending toward the radial direction of the column 3 (radial arrangement in a plane view), and effectively supports the column 3 relative to deformation in the radial direction. Each of the guide portions 4 extends longer than an end of the column 3. At the extended portion, in each of the guide portions 4, the other end face 4d in the width direction inclines inwardly in the radial direction of the column 3 toward the other end face 4b in the extending direction, so that each of the guide portions 4 is easily inserted into the hole 11 to be blocked (described later).

Each of the uprising plate portions 5 projects from the back surface 2b of the head portion between the adjacent guide portions 4. Each of the uprising plate portions 5 extends in an arc shape between the adjacent guide portions 4, so that a width (length in a circumferential direction) thereof can surround the column 3 in a circle. The uprising plate portions 5 have thinning thicknesses, so that outer surfaces of the uprising plate portions 5 incline inwardly in a radial direction of a circle formed of the plural uprising plate portions 5 toward ends (uprising end) of the uprising plate portions 5. In addition, a base end 5a of the uprising plate portion 5 is located at an outside of the column 3 in the radial direction slightly further away from the other end face 4d of the guide portion 4. Also, an end portion 5b of the uprising plate portion 5 is located slightly inside the other end face 4d of the guide portion 4 in the radial direction. Accordingly, it is arranged that the uprising plate portions 5 can be smoothly inserted into the hole 11 to be blocked (described later) following the guide portions 4. An engaging groove 7 is formed on each of the base ends 5a of the uprising plate portions 5, respectively. Each of the engaging grooves 7 extends over an entire length of the uprising plate portion 5 in the width direction (circumferential direction of the head portion 2). Each of the engaging grooves 7 is to form an engaging step portion 8 for holding the rim of the hole 11 to be blocked (described later) with the rim 2a of the head portion.

The supporting portions 6 are disposed between each of the uprising plate portions 5 and the column 3. In the present embodiment, each of the supporting portions 6 is formed in a wavy plate member, and a plate surface of the supporting portion 6 projects from the back surface 2b of the head portion 2. Each of the supporting portions 6 has one uprising end face integrated with the back surface 2b of the head portion 2. Also, each of the supporting portions 6 connects a central part of an inner surface of the uprising plate portion 5 in the width direction to an outer circumferential surface of the column 3. Accordingly, each of the supporting portions 6 limits each of the uprising plate portions 5 so as not to bend inwardly (reduce the radius) while providing elasticity to a certain extent. Further, in the present embodiment, each of the supporting portions 6 has a height from the back surface 2b of the head portion shorter than that of the uprising plate portion 5. With this configuration, as described above, the supporting portion 6 limits the base end 5a of the uprising plate portion 5 so as not to reduce the radius inwardly in the radial direction. On the other hand, the end portion 5b of the uprising plate portion 5 is easy to bend in the radial direction as opposed to the base end 5a, so that each of the uprising plate portions 5 is easily inserted into the hole 11 to be blocked (described later).

Figure 5:
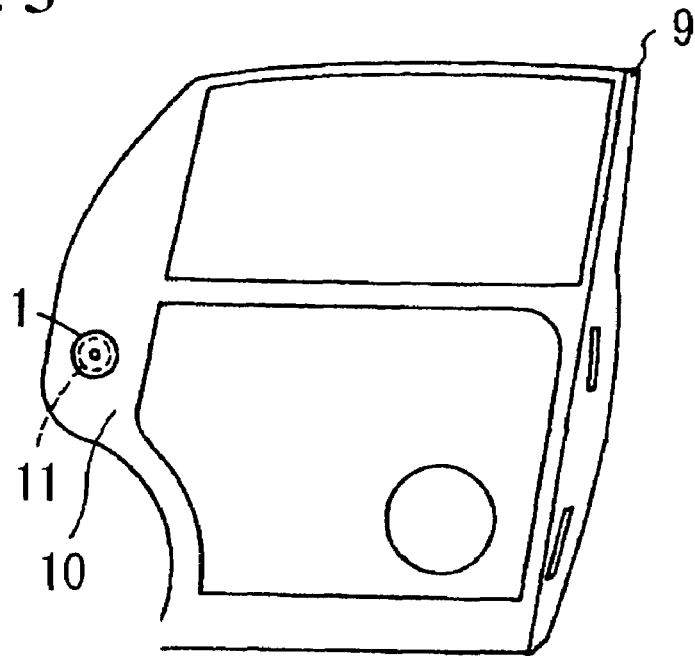
FIG. 5 is a view showing an application of the hole plug according to the embodiment.
Figure 6:
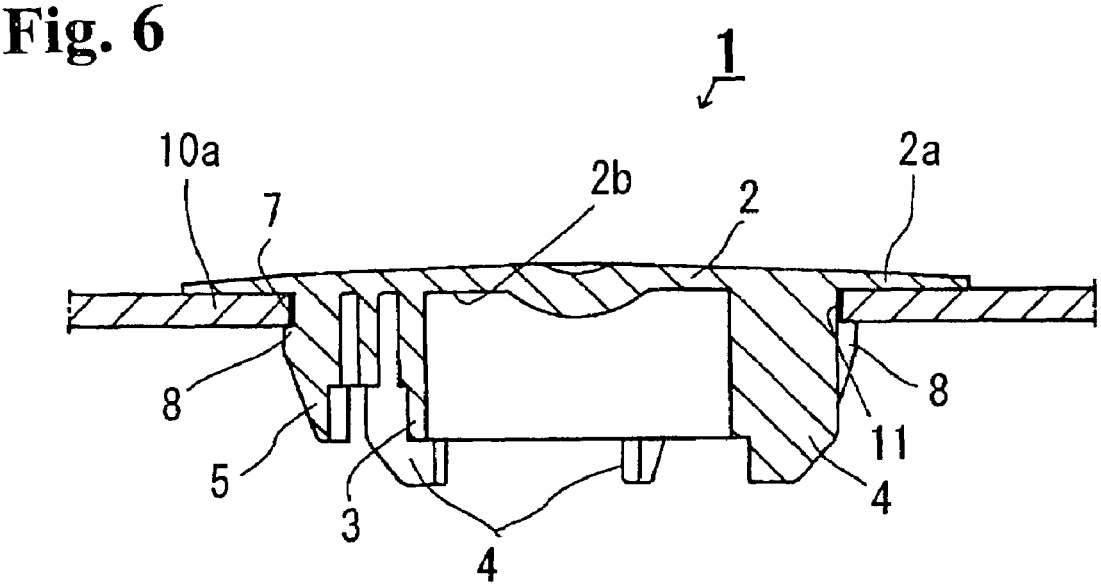
FIG. 6 is a view showing a state where the hole plug according to the embodiment is held in a hole.

As shown in FIGS. 5, 6, this type of hole plug 1 is pushed (inserted) into, for example, the hole 11 formed in an inner body 10 as a plate member of a car door 9 from a side of the uprising plate portions 5. The rim 10a of the hole is sandwiched between the engaging step portions 8 in the engaging grooves 7 and the rim of the head portion 2. Accordingly, the hole plug 1 is held by the rim 10a of the hole, and the whole portion of the head portion 2 evenly covers the hole 11, thereby obtaining a desirable appearance.

In this case, when the hole plug 1 is inserted into the hole 11, first the respective guide portions 4 are inserted into the hole 11 since the respective guide portions 4 are extended longer than the uprising plate portions 5, and then the respective uprising plate portions 5 are securely guided into the hole 11. At this time, since the foot portion is divided into the plural uprising plate portions 5 to reduce the radius easily, the hole plug 1 can be inserted into the hole 11 easily.

On the other hand, in the state where the engaging step portions 8 and the rim 2a of the head portion sandwich the rim 10a of the hole, since the engaging step portions 8 do not bend or deform by an external force of the uprising plate portions 5 in the uprising direction, only the rim 2a of the head portion bends to a flat state along the rim 10a of the hole while the rim 10a of the hole is sandwiched between the engaging step portions 8 and the rim 2a of the head portion. Due to the bending, a sealing ability of the rim 2a of the head portion relative to the rim 10a of the hole is improved. In this case, since the supporting portions 6 are disposed between each of the base ends 5a of the uprising plate portions 5 and the column 3, and limit the base ends 5a of the uprising plate portions 5 so as not to reduce the radius, it is possible to prevent the rim 10a of the hole from moving out of the engaging grooves 7 while the end portions 5b of the uprising plate portions 5 are easily bent upon the insertion. Further in this case, the supporting portions 6 are formed of wavy plate members and have the plate surfaces projecting from the back surface 2b of the head portion. Thus, it is possible to limit an inward bending force on each of the uprising plate portions 5 in the radial direction while providing the elasticity to a certain extent. Therefore, it is possible to attain the easy insertion and the stable engagement between each of the engaging step portions 8 and the rim 10a of the hole at a high level.

At this time, each of the guide portions 4 effectively limits the cylindrical column 3 so as not to deform. The column 3 properly receives the bending force of the uprising plate portions 5 through the supporting portions 6.

The present invention is not limited to the above-mentioned embodiments, and may also include the following configurations.

(1) The supporting portions 6 may be integrated with one of the back surface 2b of the head portion and the side surface of the column 3.

(2) The supporting portions 6 are formed in a plate shape and are disposed at positions diagonal to the plate faces of the uprising plate portions 5 for limiting the bending of the uprising plate portions 5.

(3) The column 3 is formed in a solid body.

While the invention has been explained with reference to the specific embodiments of the invention, the explanation is illustrative and the invention is limited only by the appended claims.

What is claimed is:

1. A hole plug for blocking a hole, comprising:
a head portion having a back surface,
a foot portion extending from the back surface of the head portion to be inserted into the hole, said foot portion including a plurality of plate members extending from the back surface of the head portion and arranged circularly with a space between two of the plate members, each of said plate members having an engaging step portion at a base close to the head portion for engaging the hole,
a cylindrical column projecting from the back surface of the head portion inside the plate members, and
a plurality of supporting means, each supporting means being disposed between the cylindrical column and each of the plate members so that the cylindrical column is connected to each of the plate members through each of the supporting means and the supporting means supports and suppresses the plate member from bending inwardly.

2. A hole plug according to claim 1, wherein said plate members are arranged circularly so that the foot portion has a cylindrical shape.

3. A hole plug according to claim 1, wherein each of said supporting means is formed at a position closer to the base than a top portion thereof.

4. A hole plug according to claim 1, wherein each of said supporting means is formed in a wavy plate shape in a radial direction and extending from the back surface of the head portion.

5. A hole plug according to claim 4, wherein said wavy plate has a height less than heights of the column and the plate member.

6. A hole plug according to claim 1, further comprising a plurality of guide means disposed between two of the plate members and extending from the back surface of the head portion, each of said guide means having a length longer than that of each of the plate members.

7. A hole plug according to claim 1, wherein said head portion has a plate shape and an outer periphery inclined toward the foot portion.

8. A hole plug according to claim 1, wherein said plurality of plate members arranged circularly are coaxially arranged with the cylindrical column, and said plurality of supporting means is arranged to substantially extend radially outwardly from the cylindrical column.

9. A hole plug for blocking a hole, comprising:
a head portion having a back surface,
a foot portion extending from the back surface of the head portion to be inserted into the hole, said foot portion including a plurality of plate members extending from the back surface of the head portion and arranged circularly with a space between two of the plate members, each of said plate members having an engaging step portion at a base close to the head portion for engaging the hole,
a cylindrical column projecting from the back surface of the head portion inside the plate members, and
a plurality of supporting means, each supporting means being disposed between the cylindrical column and each of the plate members so that the cylindrical column is connected to each of the plate members through each of the supporting means and the supporting means supports and suppresses the plate member from bending inwardly, each of said supporting means being integrated with the back surface of the head portion.

10. A hole plug according to claim 9, wherein said plurality of plate members arranged circularly are coaxially arranged with the cylindrical column, and said plurality of supporting means is arranged to substantially extend radially outwardly from the cylindrical column.

11. A hole plug for blocking a hole, comprising:
a head portion having a back surface,
a foot portion extending from the back surface of the head portion to be inserted into the hole, said foot portion including a plurality of plate members extending from the back surface of the head portion and arranged circularly with a space between two of the plate members, each of said plate members having an engaging step portion at a base close to the head portion for engaging the hole,
a plurality of guide means disposed between two of the plate members and extending from the back surface of the head portion, each of said guide means having a length longer than that of each of the plate members,
a column projecting from the back surface of the head portion inside the plate members, said column being integrally connected to the guide means to hold and support the guide means, and
a plurality of supporting means disposed between the column and each of the plate members for connecting the column and the plate member to prevent the plate member from bending inwardly.

12. A hole plug according to claim 11, wherein said supporting means is formed in a wavy plate shape in a radial direction and extending from the back surface of the head portion.

* * * * *